United States Patent Office 3,181,563
Patented May 4, 1965

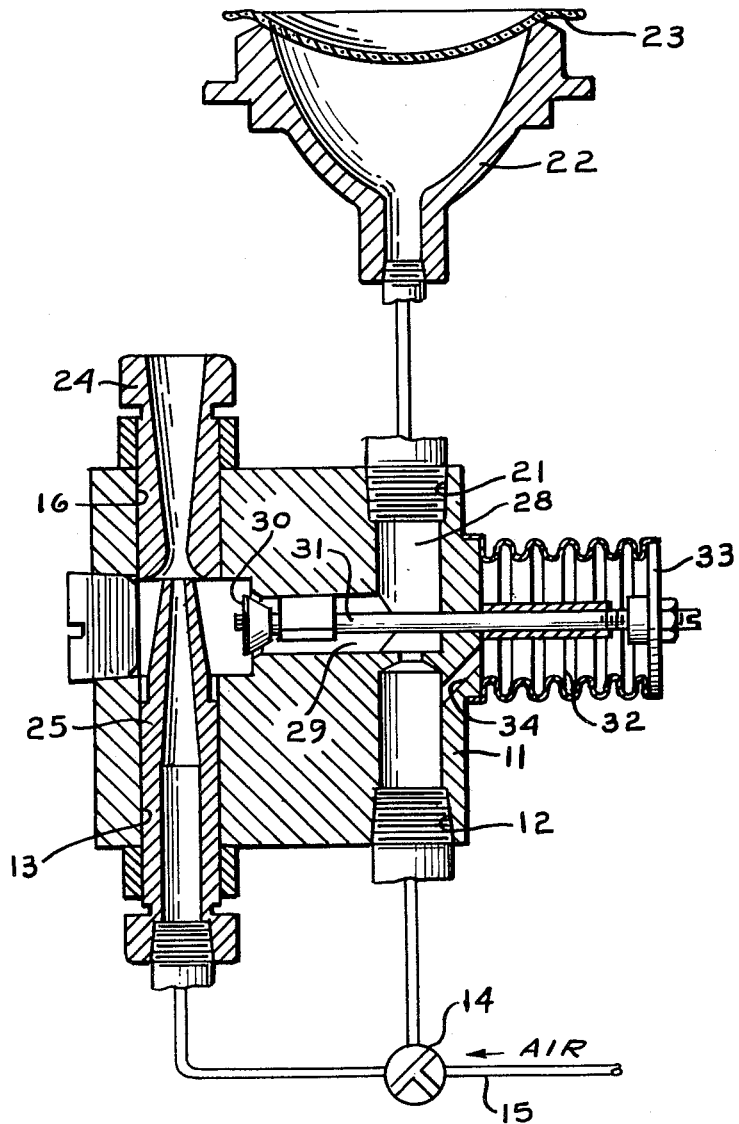

3,181,563
VALVE MEANS FOR SELECTIVELY SUPPLYING A DESIRED PORT WITH POSITIVE AND NEGATIVE PRESSURES
James W. Giffen, Corning, N.Y., assignor to Corning Glass Works, Corning, N.Y., a corporation of New York
Filed Dec. 5, 1961, Ser. No. 157,117
5 Claims. (Cl. 137—596)

The present invention relates to pneumatic components and particularly to a housing embodying an aspirator and a valve so arranged and interrelated with passages within the housing that when air from a positive pressure air supply line is introduced into one of two housing entrances the valve is closed and the air is fed to apparatus connected to a further housing entrance; and when air is introduced into another of the housing entrances the aspirator is utilized to withdraw air from the apparatus into the housing and into the stream of air passing to atmosphere through the aspirator.

A particular need for such a component arises when air at a high temperature needs to be withdrawn from a piece of apparatus, as for example from a glass forming mold wherein suction is utilized in a glass forming operation and positive pressure is subsequently used either in a further forming operation, as disclosed for example in Giffen Patent No. 2,970,405, or for the purpose of ejecting a formed article from its mold. Thus, a component according to the invention, not only obviates the need for cooling hot air drawn into a mold, but further obviates the need for a negative pressure supply line.

For a better understanding of the invention reference is made to the accompanying drawing of an elevational view, in section, of a housing embodying the invention showing a compressed air supply line alternatively available, via a suitable valve, to the respective input ports or entrances of a component housing and of a vacuum forming mold in communication with a further entrance into such housing having a sheet of molten glass arranged thereover.

Referring to the drawing in detail, the pneumatic component is embodied in a housing 11 having entrances or input ports 12 and 13 respectively connected to a valve 14 to which a positive pressure supply line 15 is connected, whereas an entrance or port 21 of such housing is connected to the bottom tubulation of a glass forming mold 22 having a sheet 23 of molten glass arranged thereover to be formed by suction and a further entrance or port 16. In the housing 11, ports 12 and 21 are at the opposite ends of a passage 28 extending through the housing. Port 13 is occupied by an aspirator bushing or nozzle 25 whose opposite end is in cooperative relation with a companion or induction bushing or nozzle 24 occupying the housing entrance or port 16.

The area of junction of nozzles 25 and 24 is in communication with passage 28 via a transverse passage 29 and a poppet valve 30 having its seat at one end of such passage. Preferably the valve 30 is normally slightly off its seat, as illustrated. The stem 31 of valve 30 extends through passages 29 and 28 and through the wall of housing 11 into a bellows chamber 32 and is connected to the movable head 33 thereof. A passage 34 in housing 11 connects the interior of chamber 30 with the housing passage 28.

As will be obvious, if valve 14 is positioned to place the positive pressure air supply line 15 in communication with port 13 air will pass through the aspirator, negative pressure will be created in the region of juncture of nozzles 25 and 24 and will unseat or further unseat valve 30 and cause air to be withdrawn by induction from the mold 22 through passages 28 and 29 and nozzle 24 to atmosphere.

On the other hand, if valve 14 is positioned to place the positive pressure supply line 15 in communication with the port 12, positive pressure will be built up in chamber 32 which will move the stem 31 to the right and seat valve 30 so that air supplied to passage 28 will be directed into the mold 22. Thus it will be seen that depending upon which of the ports 13 or 12 to which the air supply line 15 is connected determine whether suction or positive pressure is established within the mold 22.

What is claimed is:
1. A valve housing for selectively supplying a desired outlet port with positive and negative pressures solely by the application of a positive pressure to preselected inlet ports which comprises, a housing body, a pair of passages extending through said housing body, each of said passages having an inlet port and an outlet port, an aspirator formed in one of said passages, a transverse passageway communicating between said one passage adjacent the low pressure region of said aspirator and an intermediate portion of the other of said passages, a normally opened valve for closing said passageway, fluid pressure responsive means communicating with said other passage for actuating said valve, and means for alternately supplying positive fluid pressure to the inlet port of said one passage and through said aspirator to produce a negative pressure at the outlet port of said other passage and for supplying positive fluid pressure to the inlet port of said other passage to actuate said fluid pressure responsive means and close said valve to thereby supply positive pressure to the outlet port of such other passage.

2. An improved valve housing for both supplying a positive pressure to a desired outlet port and alternatively a negative pressure to such port as desired solely by the application of a positive pressure to the housing which comprises, a housing body, a passage formed in said body having an inlet port at one end and an outlet port at the opposite end, an aspirator means formed in said body, a passageway extending between the low pressure region of said aspirator and an intermediate portion of said passage, valve means responsive to positive pressure supplied to the inlet port of said passage for closing said passageway; and means for simultaneously supplying positive pressure to said aspirator and closing the inlet port of said passage to aspirate air through said passageway and produce a negative pressure at the outlet port of said passage, and for alternately supplying positive pressure to the inlet port of said passage while closing off pressure to said aspirator to close said valve means and supply positive pressure to the outlet port of said passage.

3. A valve housing for alternately supplying positive pressure and negative pressure to an outlet port as desired solely upon the application of positive pressure to the housing which comprises, a housing body, a pair of passages extending through said housing body, bushing means positioned within one of said passages forming an aspirator, a transverse passageway communicating between said passages, a valve member for closing said transverse passageway, a pressure responsive expandable wall chamber communicating with the other of said passages, a valve actuating stem connecting said valve member and the movable wall of said expandable wall chamber, means for directing fluid into said one passage and through said aspirator to draw air from the other of said passages through said transverse passageway and create a negative pressure at an outlet port of said other passage, and means for directing fluid into an inlet port of said other passage to expand said chamber and actuate said valve to close said transverse passageway and provide positive pressure at the outlet port of said other passage.

4. An improved valve housing as defined in claim 3 wherein said means for directing fluid to the various passages comprises an air supply line connected to one end of each of said passages, and a valve positioned for communication with a source of fluid under pressure and either of said supply lines to supply air to either passage while closing the entrance to the other, wherein the aspirator, when actuated, draws air through and creates a negative pressure at the unclosed end of said other passage, and the other passage, when pressurized, actuating said pressure responsive wall chamber to hold the passageway valve in a closed position so as to create a positive pressure at the unclosed end of such other passage.

5. An improved valve housing for selectively providing both a positive fluid pressure and a negative fluid pressure at a particular outlet port as desired solely by the provision of a positive fluid pressure to such valve housing which comprises, a housing body having two pairs of oppositely disposed ports in communication with a common passage, a valve for closing said passage and isolating one pair of ports from the other, a chamber having a bellows connected wall operatively connected to said valve for actuating it between open and closed positions, aspirator means communicating at its ends with one pair of said oppositely disposed ports and intermediate its ends with said common passage to, when actuated, draw air through and create a negative pressure at one port of the other pair of said ports, said chamber wall being in constant communication with the other port of said other pair of ports such that when said other port is pressurized said bellows expand to close said valve isolating said one pair of ports and pressurizing said one port of said other pair, and means for alternately supplying pressure to the inlet port of said aspirator and said other port of said other pair of ports.

References Cited by the Examiner
UNITED STATES PATENTS

| | | | |
|---|---|---|---|
| 2,417,994 | 3/47 | Sheets | 251—24 |
| 2,874,989 | 2/59 | Reynolds | 294—64 |
| 2,890,714 | 6/59 | Greenwood et al. | 251—24 |
| 2,934,086 | 4/60 | Blatt | 294—64 XR |
| 2,970,405 | 2/61 | Giffen | 65—55 |

MARTIN P. SCHWADRON, *Acting Primary Examiner.*
DONALL H. SYLVESTER, *Examiner.*